United States Patent
Schipper et al.

[11] Patent Number: 5,230,552
[45] Date of Patent: Jul. 27, 1993

[54] WORKSURFACE UTILITIES MODULE

[75] Inventors: Timothy H. Schipper, Grand Rapids; Robert J. Doornbos, Wyoming; Larry D. Fox, Grandville; Gary P. Frantz; Paul P. Hausner, both of Grand Rapids; Thomas R. Maas; Jeffery A. Musculus, both of Wyoming; Larry L. Rillema, Grand Rapids; Scott H. Russell, Kalamazoo; James L. Brandt, Jenison; David A. Shipman, Grand Rapids; Edward L. Tyler, Caledonia, all of Mich.; Steven E. Wiersma, San Diego, Calif.

[73] Assignee: Steelcase Inc., Grand Rapids, Mich.
[21] Appl. No.: 711,662
[22] Filed: Jun. 6, 1991
[51] Int. Cl.$^5$ .................. A47B 96/18; H01R 13/44
[52] U.S. Cl. .................. 312/223.6; 108/26; 312/328
[58] Field of Search .............. 108/26; 174/48, 49; 312/223, 196, 327, 328

[56] References Cited

U.S. PATENT DOCUMENTS

| | | |
|---|---|---|
| 690,155 | 12/1901 | King . |
| 1,300,286 | 4/1919 | McKay . |
| 1,307,869 | 6/1919 | McKay . |
| 1,442,284 | 1/1923 | McKay . |
| 2,415,602 | 2/1947 | Monaco . |
| 3,131,512 | 5/1964 | MacLeod, Jr. . |
| 3,135,821 | 6/1964 | Lanham . |
| 3,189,862 | 6/1965 | Vleerick et al. . |
| 3,622,684 | 11/1971 | Press . |
| 3,624,589 | 11/1971 | Drouin . |
| 3,904,936 | 9/1975 | Hamrick, Jr. et al. . |
| 3,950,053 | 4/1976 | Brighenti . |
| 3,972,579 | 8/1976 | Kohaut . |
| 4,268,100 | 5/1981 | Kekas et al. . |
| 4,372,629 | 2/1983 | Propst et al. . |
| 4,538,868 | 9/1985 | Cruise et al. . |
| 4,551,577 | 11/1985 | Byrne . |
| 4,654,756 | 3/1987 | Wilson et al. . |
| 4,734,826 | 3/1988 | Wilson et al. . |
| 4,747,788 | 5/1988 | Byrne . |
| 4,792,881 | 12/1988 | Wilson et al. . |
| 4,975,072 | 12/1990 | Afshar . |
| 4,984,982 | 1/1991 | Brownlie et al. ............ 174/48 |

FOREIGN PATENT DOCUMENTS 658303 3/1938 Fed. Rep. of Germany .

OTHER PUBLICATIONS

Herman Miller Bulletin dated May 28, 1991 discloses a "Cable Port (NP360)" product and a Multi-outlet Strip (NP358) product.

An article entitled "The Flexible Office" Concerning an Access Floor Workstation Module, the article being published by Industrial Designers Society of America, the module being made by AMP Company, received Nov., 1991, published early Nov., 1991.

Installation Instructions for "Cable Port (NP360)", published by Herman Miller Company, received Nov., 1991, publication date unknown.

Photographs of a "Cable Port (NP360)" made by Herman Miller Company, received Nov., 1991, publication date unknown.

Primary Examiner—Peter R. Brown
Attorney, Agent, or Firm—Price, Heneveld, Cooper, Dewitt & Litton

[57] ABSTRACT

A module is provided for communicating utilities to a worksurface or the like from a remote source. The module includes a housing which is pivotally mounted within an aperture in the worksurface. The housing has a hollow interior for receiving one of a plurality of utility connector modules, such as an electrical or communication receptacle. The housing is pivotable between an open position wherein the receptacle is exposed and accessible, and a closed position wherein the receptacle is substantially hidden or retracted. In the preferred embodiment, the housing naturally moves to a closed position so that the receptacles are protected by an upper surface on the housing that is contoured to direct any spilled fluids away from the receptacle when the housing is in the closed position. Also in the preferred embodiment, the receptacles are oriented so that any spilled fluids flow away from the receptacles. Further, the preferred module assembly is constructed to generally set in an aperture in a worksurface panel in a hanging fashion, thus facilitating installation, maintenance and repair.

44 Claims, 4 Drawing Sheets

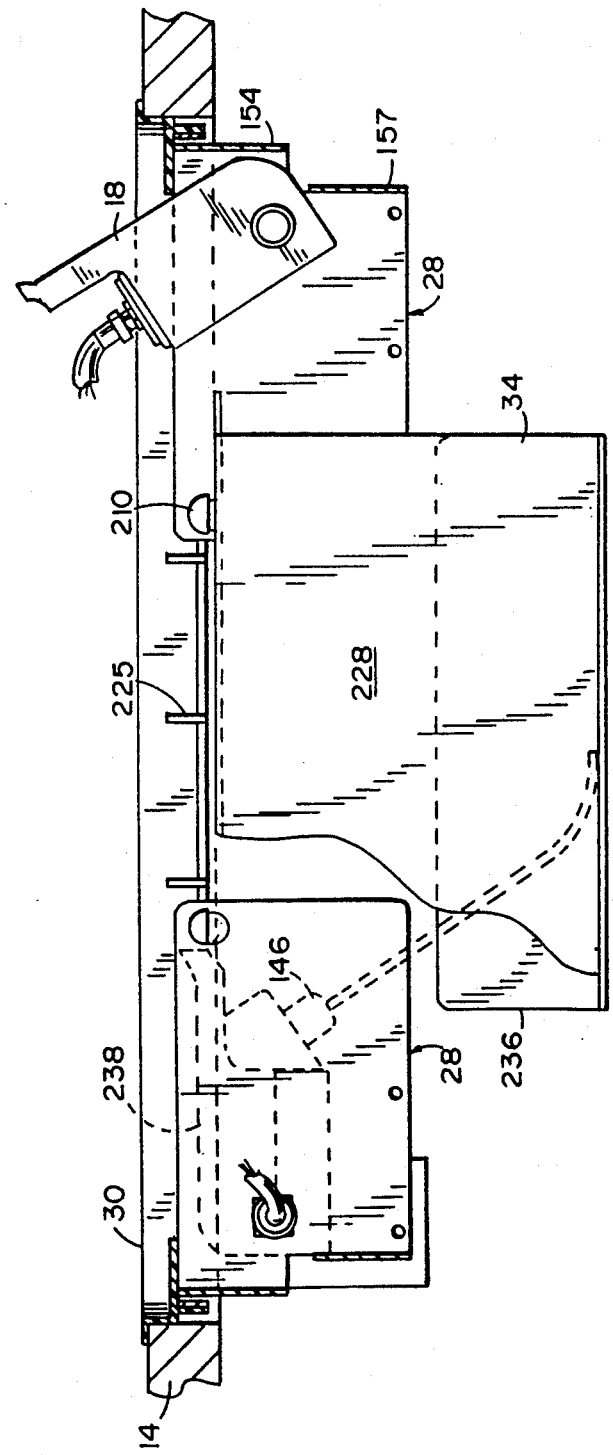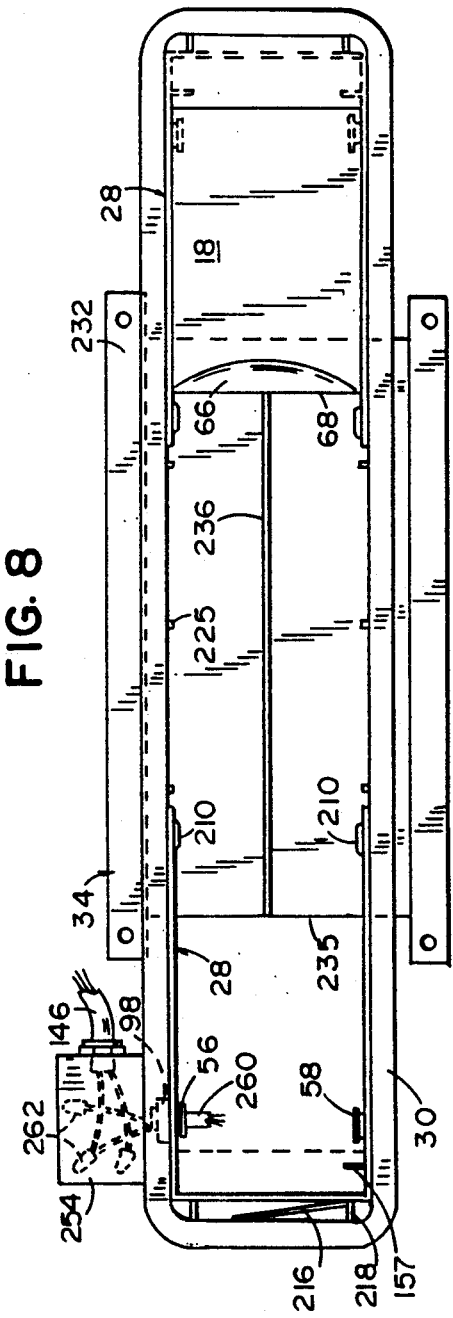

WORKSURFACE UTILITIES MODULE

BACKGROUND OF THE INVENTION

The present invention relates to furniture, and in particular to a module for communicating utilities to a worksurface or the like.

A variety of systems have been designed to convey utilities from remote locations to more convenient and useful locations adjacent a workstation. These systems are particularly desirable in modern office arrangements, wherein electronic equipment and communication devices are being increasingly emphasized and utilized.

Typically, these systems include an extension cord or cable which allows support equipment to couple to a remote utility source, and further include a module having a receptacle or outlets for presenting the utilities adjacent a worksurface, or other furniture panels. Some such modules can be moved between an access position wherein the receptacles are accessible for use, and a hidden or retracted position wherein they are hidden from view for aesthetics. Still other such devices include covers or panels that hide the module, and which must be moved to access the receptacles.

Some of these systems are subject to safety and maintenance problems such as electrical shorting if fluid such as coffee or water is spilled onto them. Many times the construction of these systems allows spilled fluid to travel directly into the receptacles, or alternatively, to travel indirectly along electrical cords into the receptacles. Further, the spilled fluid collects in pockets and crevaces, thus creating a mess as well as additional safety hazard. Many cities and states have recognized these problems and now have passed laws or have requirements specifying spill tests which these systems must pass.

These problems are further aggravated when retractables or coverable outlets are left in an exposed position. This often occurs since some operators do not fully appreciate those hazards and maintenance problems associated with the exposed outlets. As parts become broken, worn-out, or lost, this situation only becomes worse. These problems are particularly aggravated when the system is difficult to repair.

Thus, a new system is needed which positions the outlets in an accessible position, but protects the outlets and resists problems due to spilled fluids and the safety hazards related thereto. Further, a system is needed which is readily installable and repairable.

SUMMARY OF THE INVENTION

The present invention is directed to a module for dispensing utilities at a selected workstation that solves the aforementioned problems. In ne form, the module includes a housing having an imperforate cover which protects a utility connector module mounted thereto. The housing pivotally rotates between an open position allowing access to at least one receptacle opening in the utility connector module, and a closed position wherein the utility connector module moves to a protected position under the cover so that liquid spilled on the cover will not enter the receptacle opening. Further, the housing is mounted in a manner so that the housing is biased toward a closed position when an operator releases the housing after accessing the receptacle opening. Still further, the module is constructed to include a spill barrier to direct the flow of fluid spilled on the worksurface away from the housing. In the preferred embodiment, the biasing force for closing the module is achieved by gravity.

In another form, the module includes a housing pivotally mountable to a worksurface by a housing mount. A utility connector module is mounted to the housing and includes at least one receptacle for dispensing electrical power, the utility connector module being mounted so that a normal line extending from the module face through the receptacle opening is never oriented at an angle above horizontal.

In yet another form, a module for dispensing utilities at a selected workstation includes a housing mount adapted to set within an aperture in a worksurface in a hanging fashion, the housing mount including a lip that engages the marginal edge of the aperture to support the housing mount. The housing is shaped to set within the housing mount and pivot between an open access position and a closed position. The utility connector module is mounted to the housing and includes a receptacle opening oriented so that the receptacle opening is accessible when the housing is in the open access position, and hidden when the housing is in the closed position.

In narrower aspects, the invention can include a cable management tray, a plurality of different utility connector modules, and a second cover. Further, two or more modules can be mounted in opposing relationship on the worksurface, so that utilities can be dispensed in groups, such as high voltage power receptacles in one location, and low voltage communication lines in a second location.

As will be understood from the invention, numerous advantages over the prior known modules are provided by this invention. These include an arrangement especially designed to meet and pass stringent spill test regulations and also to reduce the hazards and maintenance problems from fluid spilled onto the modules. Further, the housing is mounted so as to be self-closing to further reduce the risk of spilled fluid, and also to increase the aesthetics and ease of use. Still further, the module mount and support are constructed so that fluid does not tend to collect in pockets or crevaces, and includes a spill barrier such as a lip or rim or side wall which directs fluid away from the housing and utility connection module. Further, the module is readily removable, repairable, and adaptable for use with different types of utilities as may be required at different selected workstations.

These and other advantages and features of the invention will become more apparent from a study of the following description taken in conjunction with the drawings.

BRIEF DESCRIPTION OF THE DRAWINGS

FIG. 8 is a side elevational view of a module partially broken-away to show a first housing in the closed position and a second housing in the open position; and FIG. 9 is a top view of a module with the upper cover removed, one of the housings being removed to better show the routing of wiring.

DETAILED DESCRIPTION OF THE PREFERRED EMBODIMENTS

Figures 1, 2:
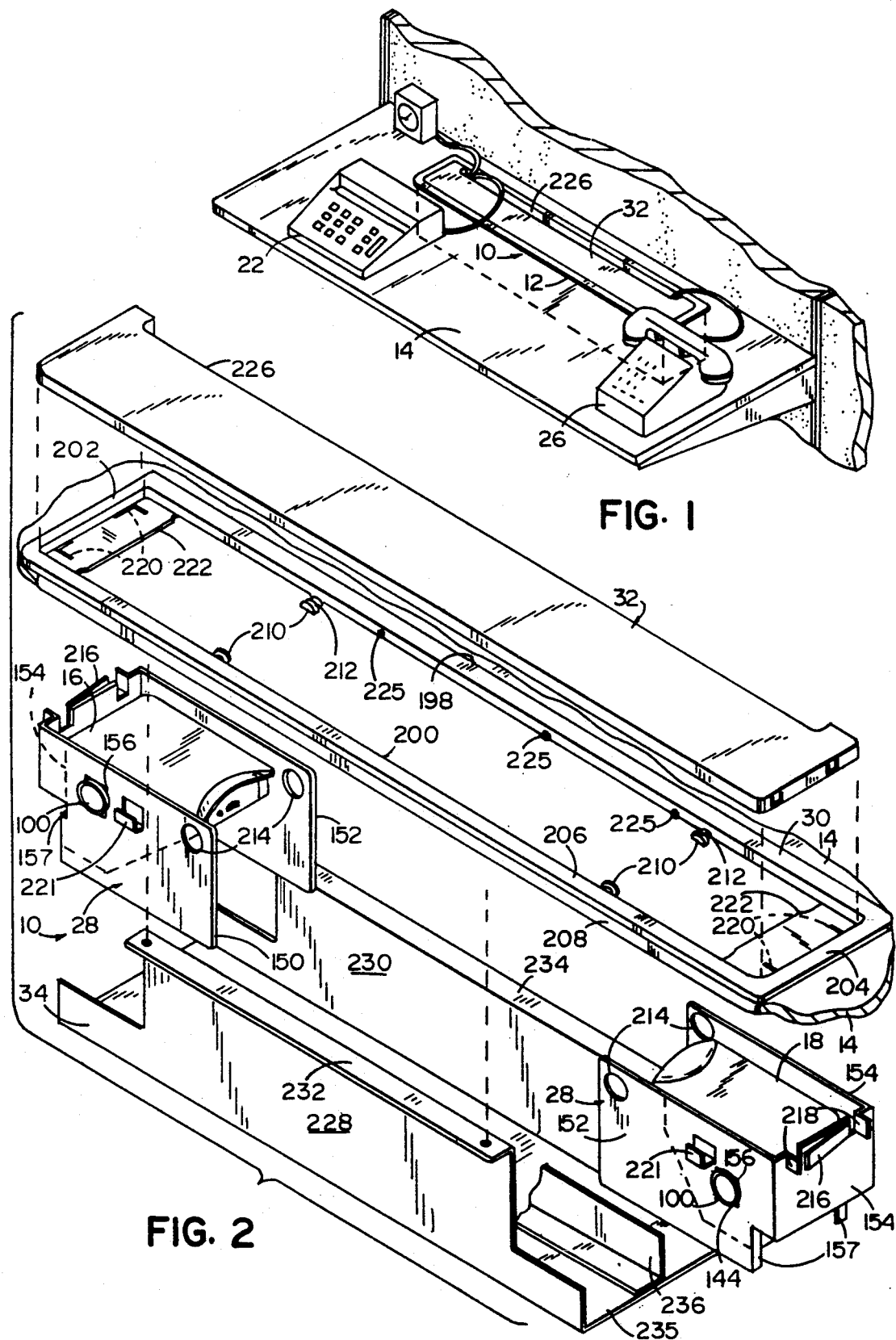
FIG. 1 is a perspective view of a module embodying the present invention, the module being positioned in a panel-hung worksurface.
FIG. 2 is an exploded perspective view of the apparatus in FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
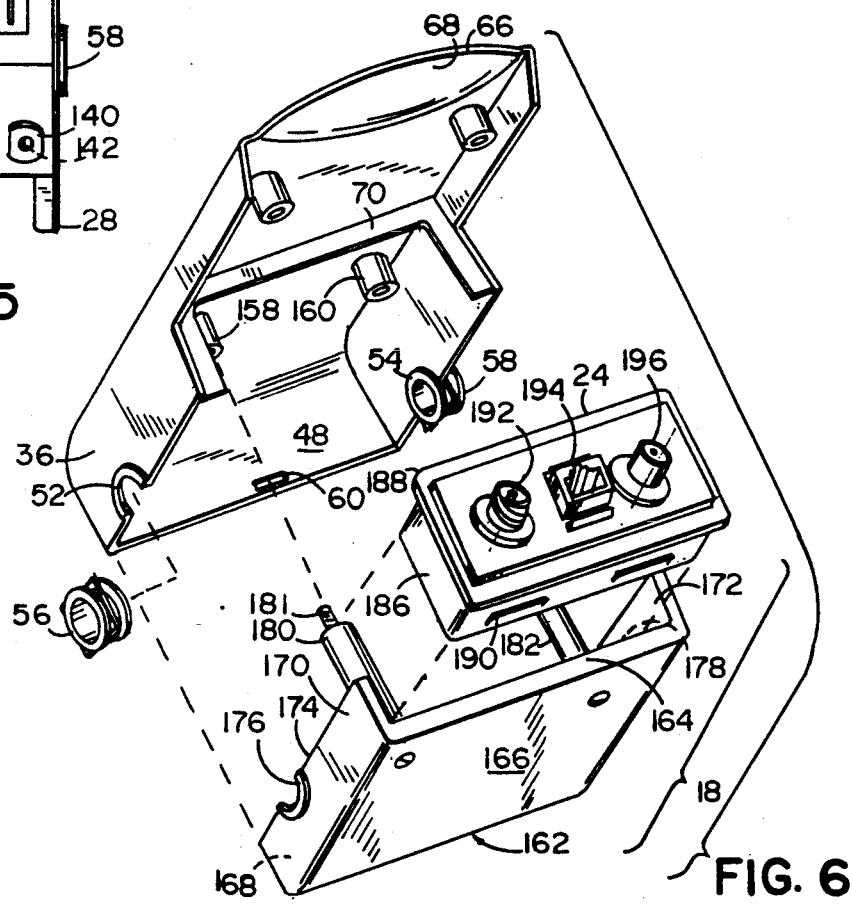
FIG. 6 is an exploded view of a module assembly including a second type of utility connector module.

Referring now to the drawings, module 10 (FIGS. 1 and 2) embodying the present invention is shown as installed in an elongated aperture 12 of a panel hung worksurface or workstation panel 14. Module 10 includes two housing assemblies 16 and 18 mounted in opposing relationship, housing assembly 16 being adapted with utility connector module 20 (FIG. 3) to dispense electrical power such as to an adding machine 22 and assembly 18 being adapted with utility connector module 24 (FIG. 6) to connect to communication utilities such as for a telephone 26, a computer terminal (not shown), and the like. Housings 16 and 18 are pivotally attached to move between an open access position and closed position on bracket or mounts 28. Each bracket 28 is in turn supported in opposing relationship by a support piece 30, support piece 30 setting within aperture 12 in a hanging fashion. A second removable and reversible cover 32 is installed in support piece 30 to cover aperture 12, thereby covering housing assemblies 16 and 18 to provide an aesthetically clean appearance to the workstation. A wire management tray 34 is positioned under housing assemblies 16, 18 to manage cables extending from utility taps in utility connector modules 20 and 24. Module 10 thus provides ready access to multiple utilities on worksurface 14. It is contemplated that module 10 can be installed substantially anywhere on worksurface 14 though it is shown centrally positioned in the rear thereof. Also it is contemplated that module 10 can be installed on substantially any horizontal surface where utilities are needed such as desks, credenzas, tables, carts, and the like, though only a workstation panel is shown.

Housing assembly 16 (FIGS. 3 and 4) includes a housing which is made of housing outer half 36 and inner half 38 which mateably join to form an interior compartment 40. Outer half 36 includes an imperforate cover 42, side walls 44, 46 and rear wall 48 that form an open box-like structure. The lower edge of walls 44, 46 and 48 form a stepped ledge 50 that overlappingly joins with a similar edge on inner half 38 to form a substantially liquid tight joint. Near the rear of side walls 44, 46 are semicircular notches 52, 54 that receive pivot pegs 56 and 58. Rear wall 48 includes an attachment slot 60 and imperforate cover 42 includes bosses 62, 64 for securely retaining housing inner half 38. Imperforate cover 42 also includes a front portion 66 that provides a finger grip for lifting housing assembly 16 from the closed position to the open position during use. Optimally, front portion 66 is also contoured to direct fluid away from front edge 68. Web 70 extends between side walls 44, 46 and stabilizes them.

Housing inner half 38 is an open box-like structure formed by top wall 72, angled wall 74, bottom wall 76, rear wall 78, and side walls 80, 82. Rear wall 78 includes a tongue (not shown) which slips within slot 60 of outer half 36 in a tongue and groove relationship to retain rear wall 78 to rear wall 48. Tabs 84, 86 are positioned to touch the ends of bosses 62, 64 so that screws 88, 90 slip through holes in tabs 84, 86 into bosses 62, 64 to hold inner half 38 to outer half 36 to form housing assembly 16 Ledge 92 along the lower edge of walls 78 80 and 82 mates with ledge 50 to form a substantially liquid tight joint, ledge 50 overhanging on the outside of ledge 92 so as to cause fluid to wash past the joint therebetween. Thus, housing walls 78, 80, 82 provide a spill barrier means for preventing spilled fluid from washing into housings 16, 18 and around utility connector modules 20, 24 held therein. Two semicircular notches 94, 96 along ledge 92 on the edges of side walls 80, 82 join with notches 52, 54 on side walls 44, 46 to form circular openings.

Pivot pegs or axles 56, 58 each include a central shaft 98 with enlarged circular end disks 100, 102 on either end. A square disk 104 is positioned adjacently inside of enlarged outer end disk 100 on shaft 98. Shaft 98 has a diameter which fills the circular openings formed by notches 52, 94 and notches 54, 96. Disks 102 and 104 are too large to fit through the openings formed by notches 52 and 94, and notches 54 and 96 so that pegs 56, 58 are loosely but securely captured in the sides of housing assembly 16, thereby permitting housing assembly 16 to rotate thereon. Notches 52, 94, 54, and 96 position pegs 56, 58 on housing assembly 16 (and 18) so that the center of gravity of housing assembly 16 is forward of pegs 56, 58. Thus, housing assembly 16 is unstable in the open position and naturally tends to fall to the closed position, thereby returning connector module 20 (and 24) to the most protected position. This self closing feature helps assure that housing assembly 16 (and 18) is always returned to its closed position wherein maximum protection against shorting due to spilled fluids is provided.

Figure 3:
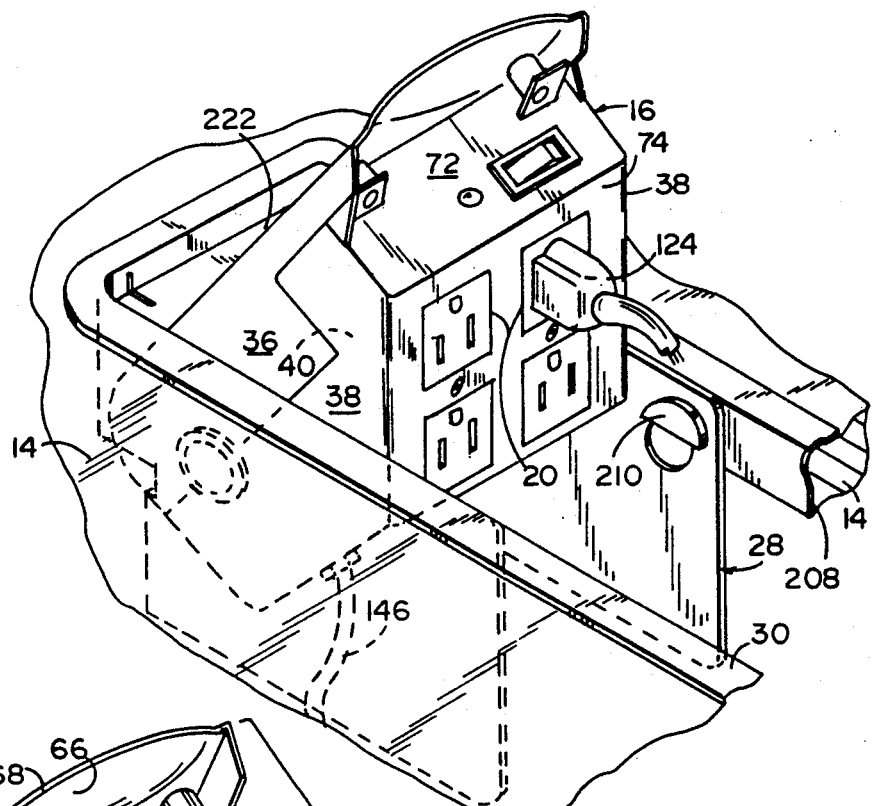
FIG. 3 is a perspective view of a housing and utility connector module shown as pivoted to an open position.
Figure 4:
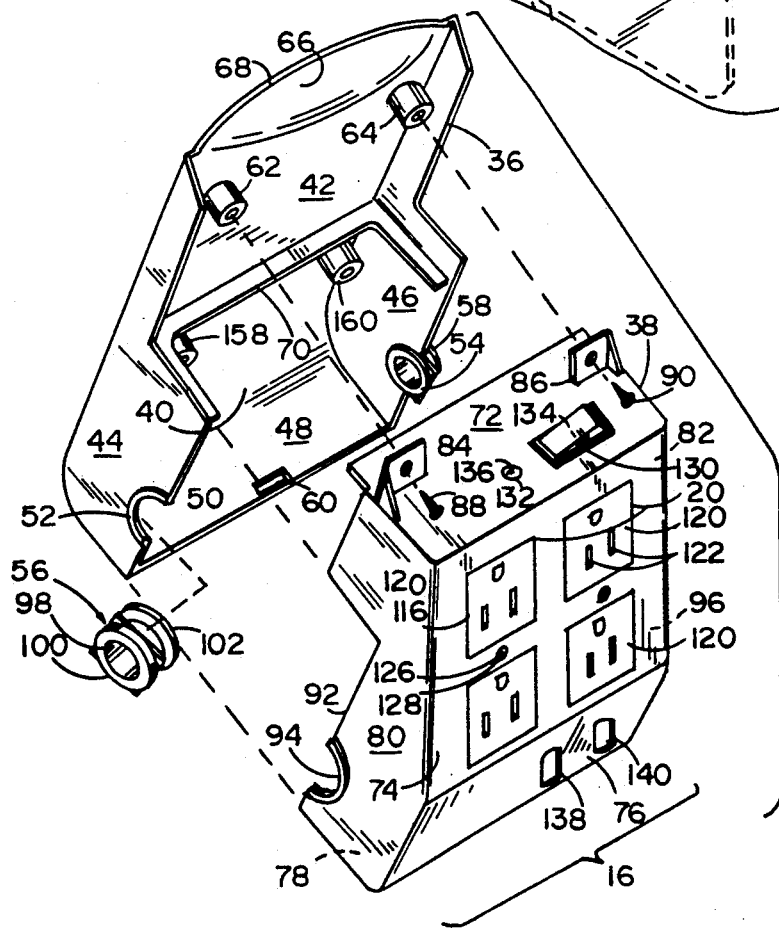
FIG. 4 is a partially exploded perspective view of the housing and utility connector module shown in FIG. 3.

Housing inner half 38 (FIGS. 4 and 5) further includes four square apertures 116 on angled wall 74, square apertures 116 being sized and spaced to closely receive two electrical utility connector modules or duplex receptacles 20 with square faces 120 having openings 122 for dispensing 120 V electrical power to a removable electrical power tap 124 (FIG. 3). Two holes 126 permit screws 128 to secure duplexes 20 to the inside surface of angled wall 74 Though two duplex receptacles are shown, it is contemplated that alternative arrangements are possible. Optimally, duplexes 20 are positioned in a protected position under imperforate cover 42. Front portion 66 of cover 42 overhangs duplexes 20 particularly when housing assembly 16 is in the closed (downward) position. Further, assembly 16 never orients duplex faces 120 above horizontal thus increasing resistance to electrical shorting, as is further discussed below.

Figure 5:
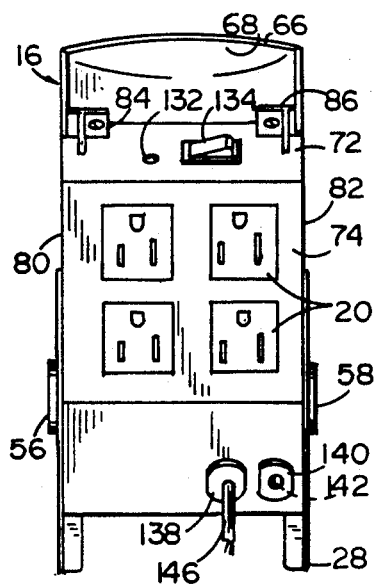
FIG. 5 is a front elevational view of the utility connector module in FIG. 3.

Top wall 72 includes two openings 130 and 132, opening 130 holding a reset switch 134 and opening 132 holding a "power on" indicator light 136. Bottom wall 76 also includes two openings 138 and 140, opening 138 providing an inlet for electrical power cord 146 and, opening 140 holding a fuse 142 or reset or over current protector (not shown) (FIG. 5).

It is specifically contemplated that circuitry could be added within housing 16 such as, for example, to make three of the four electrical outlets provided by the pair of duplexes 20 slaves to the fourth and primary electrical outlet such that a single primary electrical outlet would control the power distribution to the other three. This circuitry would, for example, turn off power to the three slave electrical outlets unless power was being supplied to the primary electrical outlet. Such circuitry would be particularly useful for computer driven equipment wherein the main computer processor is attached to the primary outlet, and computer accessories such as external disk drives, printers, VDT terminals, and the like are attached to the other three slave outlets. In this arrangement, power would be supplied to the slave outlets only when the primary processing unit is turned on.

Housing assembly 16 (FIG. 2) fits within a laterally facing U-shaped housing mount or bracket 28. Mount 28 has two vertically extending side walls 150, 152 and a vertically extending rear wall 154. Side walls 150, 152 and rear wall 154 provide a spill barrier means for preventing fluid spilled on worksurface 14 from washing into and around housings 16, 18 and the utility connector modules 20, 24 therein in two ways. First, walls 150, 152, and 154 provide a physical wall or barrier to fluids. Second, bracket 28 has an open bottom allowing fluids to drain away. Side walls 150, 152 each include a square opening 156 that captures square disk 114 of pivot pegs 56, 58 but blocks enlarged outer end disk 100. Thus, pivot peg 56 is held in position with outer end disk 100 trapped in square aperture 156 in bracket side wall 150, shaft 98 held in the opening formed by notches 52 and 94, and inner end disk 102 trapped inside of housing half side walls 44 and 80 against the perimeter of notches 52 and 94. Pivot peg 58 is similarly captured on the opposite side of housing assembly 16. Flanges 157 extend inwardly from the rear of side walls 150, 152 and serve to limit the downward pivoting motion of housing assemblies 16, 18 by abutting rear wall 78 of housing inner half 38.

Housing assembly 18 (FIG. 6) also utilizes a housing outer half 36. Outer half 36 includes a second pair of bosses 158, 160 to attach a second housing inner half 162 thereto. Second inner half 162 is an open box-like structure formed by a top wall 164, flat wall 166, rear wall 168 and side walls 170, 172. Side walls 170, 172 are similar to side walls 80, 82 as far as including a ledge 174 which extends around the edge of walls 168, 170, and 172 to join with ledge 50 of outer half 36. Side walls 170, 172 also include notches 176, 178 to form openings with notches 52, 54 for retainably receiving pivot pegs 56, 58. Elongated bosses 180, 182 extend perpendicularly from flat wall 166 to bosses 158, 160. A tongue (not shown) on rear wall 168 engages slot 60 in housing outer half 36 and screws 181 engage bosses 158, 160 to hold second inner half 162 securely on outer half 36.

Top wall 164 (FIG. 6) forms a rectangular opening with web 70. A communication utility connector module 24 with base 186 is sized to mateably set within the rectangular opening formed by web 70 and top wall 164. Rim 188 abuts the outer marginal edge of the rectangular opening formed by web 70 and wall 164, and locking tabs 190 securely hold connector module 24 in place. The face 192 of connector module 24 shown includes a telephone jack 194 and two telecommunication video jacks or taps 196. It is contemplated that several different utility connector modules with several different types and arrangements of jacks may be used interchangeably in place of connector module 24.

Housing mount or bracket 28 (FIG. 2) is shaped to mateably fit within an elongated support piece 30. Support piece 30 has an elongated rectangular picture-frame like shape, and is formed by side members 198 and 200 and end members 202 and 204. Members 198, 200, 202, and 204 have an inverted L-shaped cross-sectional shape (FIG. 3) with a horizontal upper wall 206 and a vertical inner wall 208. Support piece 30 is sized to slip vertically downwardly within aperture 12 which is cut in worksurface 14, with horizontal wall 206 covering the ragged marginal edge of aperture 12 and providing support for vertical wall 208. Horizontal wall 206 provides a third spill barrier means for preventing spilled fluid from washing into and around housings 16, 18 from worksurface 14 by providing a dam-like surface which is raised somewhat above worksurface 14 and extends around aperture 12. Vertical wall 208 has protrusions 210 with enlarged heads 212 (FIG. 2). Holes 214 in side walls 150, 152 of housing mount 28 slip over heads 212 and engage the shaft of protrusions 210. A cantilever or leaf spring 216 (FIG. 9) acts against rear wall 154 to bias mount 28 forwardly on protrusions 210 thereby causing mount 28 to releasably but securely engage protrusion heads 212. Rear wall 154 of mount 28 also includes rearwardly projecting tabs 218 which supportingly engage slots 220 in support piece ends 202, 204. Thus mount 28 is releasably held within support piece 30, and is releasable by compressing leaf spring 216 so as to position mount holes 214 centrally on protrusion heads 212. Side walls 150, 152 are then squeezed inwardly so as to disengage them from protrusions 210, and housing assembly 16 (or 18) and mount 28 can then be lifted free. Alternatively, module 10 can be fully removed from worksurface 14 by lifting support piece (and all parts connected thereto) vertically out of aperture 12 in worksurface 14.

In the preferred embodiment, support piece 30 is held firmly to worksurface 14 such as by double sided foam adhesive tape attached under horizontal wall 206 to prevent the sharp edges of aperture 12 from being unnecessarily exposed. This also prevents module 10 from moving within aperture 12 during use. Alternatively, support piece 30 can be held in place by staples affixed through vertical wall 208 into worksurface 14 wherein worksurface 14 is wood, press-board, or the like.

Support piece 30 (FIG. 2) also includes webs 222 that limit the rotational movement of housing assemblies 16, 18 as they are pivoted upwardly. Webs 222 provide a stop which abuts imperforate covers 42 to prevent over-rotation of housing assemblies 16, 18 so that faces 120 of electrical duplexes 20 are at all times facing equal to or below a horizontal position. In other words, a normal line extending through openings 122 normally to faces 120 is at all times forced to assume an angle at or below horizontal. Thus, fluid spilled on housing assemblies 16 tends to wash downwardly and away from (and not into) openings 122. This characteristic helps reduce the possibility of electrical shorts caused by spilled fluids (such as coffee, and the like). Further, this characteristic helps in passing spill test regulations and laws now present or being passed by various government bodies and the like. Also favorably impacting spill test results is imperforate cover 42 (particularly front portion 66) which shields connector module 20 (and 24). Further, horizontal wall 206 of support piece 30 acts as a dam to keep spilled fluid on worksurface 14 and out of aperture 12. The self closing feature further favorably impacts spill test results by moving housing assemblies 16 and 18 naturally toward the closed position.

A second separate cover 32 (FIG. 2) mateably sets within support piece 30 on end webs 222 and also on mid-support tabs 225. Cover 32 is substantially rectangular and flat, but includes an elongated notch 226 for cable/cord ingress to connector modules 20 (and 24). Cover 32 is reversible so that notch 226 can be positioned either in the front or in the rear for maximum utility. Cover 32 is constructed to both improve aesthetics and also cover aperture 12 to prevent foreign objects from falling therein. Cover 32 also includes an upper surface that directed spilled fluids away from housings 16, 18 and utility connector modules 20, 24.

A cable management tray 34 (FIGS. 2 and 8) is positioned under housing assemblies 16, 18. Tray 34 straddles support piece 30 and attaches to the underside of worksurface 14. Tray 34 includes side walls 228, 230 with attachment flanges 232, 234 and bottom wall 235. A divider 236 divides tray 34 into two halves, one half being for high voltage lines, and the second half being for low voltage lines, thereby reducing electrical noise and interference therebetween. Divider 236 can be held in place such as by double sided foam tape, or by any of a number of other methods.

As will be apparent to one skilled in the art, module 10 is uniquely constructed to facilitate retrofit applications as well as original furniture manufacture. Support piece 30 fits within an aperture 12 to provide a vertically top down installation which is readily accomplished on existing furniture on worksurfaces.

OPERATION

Having described the components of the present invention and the interconnection thereof, the operation and use of the present invention will become apparent to one skilled in the art. Briefly, an elongated rectangular aperture 12 is formed within a worksurface 14 (FIG. 1) and elongated support piece 30 is placed therein. Aperture 12 can be formed as a part of an original manufacturing operation or as a retrofit operation on an existing worksurface 14. A pair of duplex electrical receptacles or electrical utility connector modules 20 are attached to the inside of housing inner half 38, with faces 120 extending outwardly and positioned within square apertures 116 on angled wall 74 of housing inner half 38. Power cord 146 is extended outwardly through cable inlet 138 and downwardly such that it can be connected to a remote power source (not shown). Additional circuitry is added within interior compartment 40 and to the inside of inner half 38 to control duplexes 20 such as reset switch 134, indicator light 136, fuse 142 (not shown), or reset button and the like.

Pivot pegs 56, 58 are then placed through square openings 156 and side walls 150, 152 of housing mount 28 with peg shafts 98 extending toward the inside. Housing inner half 38 is then positioned on housing outer half 36 within housing mount 28 by engaging a tongue (not shown) in slot 60 with pivot pegs 56, 58 held within notches 52, 54, 94 and 96. Inner half 38 is then permanently attached by threading screws 88 through attaching tabs 84, 86 into bosses 62, 64. Housing inner half 38 and housing outer half 36 are positioned such that notches 52 and 94, and also notches 54 and 96 clampingly close on central shaft 98 such that housing assembly 16 (formed by housing outer half 36 and housing inner half 38) is pivotally mounted on pivot pegs 56, 58 and to bracket 28. Housing mount 28 is then positioned on support piece 30 by slipping rear locking tabs 218 under end webs 222 and within slots 220, with leaf spring 216 compressed such that holes 214 slip over enlarged heads 212 of bracket protrusions 210. Mount 28 is then released with leaf spring 216 pushing housing 16 forward relative to support piece 30 such that mount 28 is securely held by support piece 30 at the rear by tabs 218 and at the front on each side by protrusions 210.

Similarly, a second housing inner half 162 is attached to housing outer half 36 to form housing assembly 18. Second housing inner half 162 is clamped against housing inner half 36 capturing pivot pegs 56 and 58 thereby mounting housing assembly 18 to a second housing mount 28. Communication connector module 24 is attached in the opening formed at the top of housing assembly 18 at top wall 164 and web 70, communication connector module 24 held in place by rim 188 and tabs 190. Housing assembly 18 and the associated mount 28 are then attached to support piece 30 in opposing relation to housing assembly 16 by attaching the associated housing mount 28 to the opposing end of support piece 30 utilizing tabs 218 and protrusions 210 as noted previously.

Cable management tray 34 is attached to the underside of worksurface 14 under aperture 12. Tray 34 optionally includes a divider 236 which divides cable management tray 34 into two channels, one channel being useful for holding high voltage lines and one channel useful for holding low voltage lines thereby reducing the electrical interference therebetween. A substantially planar separate cover 32 is then snapped onto support piece 30 to cover housing assemblies 16 and 18 and housing mounts 28, thereby providing an aesthetically clean and attractive arrangement. Cover 32 is snapped in place in either of two different orientations to orient notch 226 for cable egress in the location desired.

When it is desired to electrically connect a electrical power utilizing device such as adding machine 22, an operator removes removable cover 32 and grips housing assembly 16 at front portion 66 to pivot housing assembly 16 upwardly. This positions the square faces 120 of duplexes or electrical utility connector modules 20 in an exposed and easily accessible location Housing assembly 16 pivots upwardly until imperforate cover 42 strikes one of webs 222 to stop the upper rotation thereby preventing square faces 120 of duplex 20 from rotation to a position facing above horizontal. An electrical power tap 124 is then plugged into one of the outlets provided by duplex 20 (FIG. 3) and the access cable extending therefrom is conveniently placed in one of the channels provided directly below by cable management tray 34.

When housing assembly 16 is released by the operator, housing assembly 16 naturally pivots forwardly and downwardly into a closed position due to the center of gravity of housing assembly 16 which is designed to be forward of pivot pegs 56, 58. The forward downward rotation of housing assembly 16 is stopped by rear walls 48 and 78 of housing outer half 36 striking flanges 157 at the rear of side walls 152, 154.

Similarly, communication housing assembly 18 is accessed by gripping the front position 66 of housing outer half 36 and pivoting housing assembly 18 upwardly. A communication utility using device such as telephone 26 is then connected to telephone jack 194, and excess telephone cable is placed within cable management tray 34 on an appropriate side of divider 236. Housing assembly 18 is then released and falls naturally by gravitational pull to a closed position inside of support piece 30.

In the closed position, housing assembly 16 and 18 are positioned so that imperforate covers 42 of housing outer half 36 are substantially horizontal thus providing an umbrella-type shielding effect or canopy-like barrier over housing assembly 16 and 18 to protect utility connector modules 20 and 24. Specifically, the outlets provided by duplex 20 and jacks and taps provided by utility connector module 24 are oriented downwardly such that power taps 124 and other releasable interconnections are at all times oriented at or below horizontal. In this position, coffee or other fluids spilled on worksurface 14 and washing toward housing 16, 18 are directed away from utility connector modules 20 and 24, thereby reducing safety and maintenance hazards from the spilled fluid. This also prevents fluid from flowing along cables to power taps 124 and indirectly into the associated outlets. Further, the horizontal wall 206 of support piece 30 acts as a dam to prevent fluid from washing across worksurface 14 into aperture 12. Further, the generally open construction of module 10 prevents spilled fluid from collecting in pockets and crevaces within the constructed assembly. Second cover 32 offers further protection as it is placed within support piece 30 above housing assembly 16 and 18. Cables and cords extending from various utility devices such as adding machine 22 and telephone 26 are routed through notch 226 with excess cable being collected and placed within cable management tray 34, a position which is below utility connector modules 20, 24.

MODIFICATION

Figure 7:
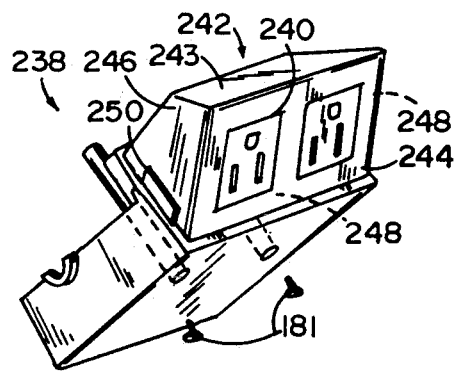
FIG. 7 is a perspective view of a third type of utility connector module.

It is contemplated that various types and arrangements of modules could be placed within housing assembly 16 or 18. One arrangement specifically contemplated is a housing 238 (FIG. 7) wherein a duplex receptacle 240 (or the like) is placed within a duplex retainer 242. Duplex retainer 242 has a top wall 243, an angled face 244, side walls 246, 248, and base 248. Base 248 includes locking tabs 250 which allow it to be snappably retained within the opening formed by second housing inner half 162 as it is attached to housing outer half 36 and specifically the opening formed by top wall 164 and web 70. Screws 181 attach second housing inner half 162 to housing outer half 36. The arrangement is otherwise quite similar to housing assembly 18. Angled face 244 allows the face of duplex 240 to be angled such that the face never reaches a position facing above horizontal.

In a third embodiment (FIG. 9), central shaft 98 of pivot peg 56 is made hollow such that power can be routed centrally through pivot peg 56 and into an electrical power junction box 254 positioned either beside or over the end of pivot peg 56 such as on side tabs 221. In this arrangement, jumper wires 260 can be joined to power cord or hard wires 146 by wire nuts 262 within box 254 and simply routed as desired. Thus, the power cord 146 need not be draped downwardly under worksurface 14, but can be controllably managed laterally away from housing assemblies 16, 18 immediately below worksurface 14. Junction box 254 also provides room for hardware such as electrical circuitry for surge protection or electrical line conditioning for outlets 20.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. A module for dispensing utilities at a selected workstation location comprising:
   a housing defining an interior compartment, said housing including an imperforate cover and further including side walls and a front portion extending from said imperforate cover fully around said imperforate cover to form a protective canopy-like barrier over the interior compartment;
   mounting means for mounting said module in a worksurface;
   pivot means for pivotally connecting said housing with said mounting means to permit rotation of said housing between an open position for access, and a closed position wherein said housing is retracted below the selected worksurface;
   a utility connector module having a face with at least one receptacle opening therein shaped to detachably receive a removable utility tap therein and through which associated utilities can be selectively accessed, said utility connector module being mounted on said housing beneath said imperforate cover such that rotation of said housing into the closed position moves said utility connector module to a protected position under said imperforate cover so that liquid spilled on said imperforate cover will not enter said receptacle opening;
   self-closing means for biasing said housing toward said closed position from any position including the open position, whereby when an operator releases said housing after accessing said receptacle opening said housing automatically returns said utility connector module to the protected position; and
   spill barrier means for preventing fluid spilled on the worksurface from washing into and around said utility connector module, said spill barrier means including said imperforate cover and said side walls which form the canopy-like barrier over said interior compartment.

2. The apparatus as defined by claim 1 wherein said said housing includes an upper half with sides and a lower half having mateable sides that join with the upper half sides to form a substantially liquid-tight joint therebetween.

3. The apparatus as defined by claim 2 wherein said pivot means includes axle means laterally extending from opposite sides of said housing to facilitate the rotation of said housing.

4. The apparatus as defined by claim 3 including a plurality of different utility connector modules, each having a unique face and related set of openings; and means for detachably mounting one of said utility connector modules on said housing beneath said imperforate corner.

5. The apparatus as defined by claim 4 wherein said mounting means includes a rim which functions as a part of said spill barrier means.

6. The apparatus as defined by claim 5 wherein said self-closing means includes locating said pivot means with respect to said housing so that gravity causes said housing to close when released by an operator.

7. The apparatus as defined by claim 6 wherein said housing is adapted to hold electrical circuitry, switches, fuses, and the like therein.

8. The apparatus as defined by claim 7 wherein a portion of said module face is located above the selected workstation panel when said housing is in the open position.

9. The apparatus as defined by claim 1 wherein said interior compartment is substantially liquid-tight and is adapted to hold electrical circuitry, switches, fuses, and the like therein.

10. The apparatus as defined by claim 1 wherein said mounting means includes a rim which functions as a part of said spill barrier means.

11. The apparatus as defined by claim 1 including a wire management tray mounted under said module, said tray adapted to loosely retain a portion of the cables associated with the removable utility taps.

12. The apparatus as defined by claim 1 including a plurality of different utility connector modules having different faces and openings interchangeably mountable to said housing, at least some of said different faces being oriented at different angles with respect to said housing when installed so that a selected one of said utility connector modules orients the at least one receptacle opening at a desired angle when the module is in the open position and also when the module is in the closed position.

13. The apparatus as defined by claim 12 wherein said plurality of different utility connector modules includes at least one utility connector module having an electrical receptacle opening and at least a second utility connector module having a communication receptacle opening.

14. The apparatus as defined by claim 1 wherein said mounting means is adapted to receive at least two of said housings positioned in opposing relationship.

15. The apparatus as defined by claim 1 including a second cover for aesthetically covering said housing, mounting means, and utility connector module.

16. The apparatus as defined by claim 1 wherein said mounting means includes a support piece adapted to set in an aperture in the workstation panel in a hanging fashion thereby facilitating installation.

17. The apparatus as defined by claim 16 wherein said support piece includes a marginal lip which covers the marginal edge of the aperture, said marginal lip providing support for said mounting means and said housing and also forming a part of said spill barrier means.

18. The apparatus as defined by claim 16 wherein said mounting means includes a bracket that cooperates with said support piece to mount said housing on the workstation panel, said bracket including walls forming a part of said spill barrier means.

19. The apparatus as defined by claim 18 wherein said bracket includes a quick attachment means for installing or removing said housing to facilitate installation and repair.

20. The apparatus as defined by claim 1 wherein said mounting means includes a quick attachment means for installing and removing said housing from the workstation panel to facilitate installation and also removal and repair.

21. The apparatus as defined by claim 1 wherein said pivot means includes an opening to allow utility source cables and cords to be laterally routed therethrough to said utility connector module.

22. In a furniture unit of the type having a worksurface, the improvement of a module for dispensing utilities at a selected location on said workstation, comprising:
a mounting bracket positioned in a selected portion of said worksurface;
a housing defining an interior compartment and having an imperforate cover and side walls extending from said imperforate cover, said housing being shaped for reception within said mounting bracket;
pivot means for pivotally connecting said housing with said mounting bracket to permit rotation of said housing between an open and closed position;
a utility connector module having a face with at least one electrical receptacle opening therein for dispensing electrical power shaped to detachably receive a removable utility tap therein and through which associated utilities can be selectively accessed;
said utility connector module being mounted on said housing beneath said imperforate cover such that rotation of said housing into the closed position retracts said housing below the worksurface and rotation of said housing into the open position provides ready access to said utility connector module; said module face when in any position being oriented such that a line extending perpendicularly from said face through said at least one electrical receptacle opening is never oriented at an angle above horizontal; and
a removable cover positionable to cover said housing when said housing is in the closed position, said removable cover, when installed, including a portion recessed partially below the level of the worksurface whereby liquid spilled on said housing and said utility connector module will naturally flow away from said at least one receptacle opening and not into said electrical receptacle opening.

23. The apparatus as defined in claim 22 wherein said imperforate cover extends substantially horizontally over said electrical receptacle opening when said housing is in the closed position, said imperforate cover being shaped to direct liquid away from said electrical receptacle opening.

24. The apparatus as defined by claim 22 wherein said mounting bracket is adapted to set in an aperture in the worksurface and be supported in a hanging fashion from the marginal edge of the aperture.

25. The apparatus as defined by claim 24 including an open tray positioned generally below said utility connector module and adapted to manage the excess length of cords and cables extending from the removable utility taps plugged into said utility connector module.

26. The apparatus as defined by claim 25 wherein said open tray includes a divider to separate the cords and cables carrying different types of utilities to prevent interference therebetween.

27. The apparatus as defined by claim 26 wherein said mounting bracket is adapted to receive at least two of said housings.

28. The apparatus as defined by claim 22 wherein said pivot means provides space between said mounting bracket and said housing through which liquids flow when spilled onto said housing.

29. The apparatus as defined by claim 22 including a plurality of different types of said utility connector modules that can be selectively mounted to said housing, said plurality of modules having respective faces with different types and arrangements of receptacle openings therein shaped to detachable receive different types of removable utility taps.

30. The apparatus as defined by claim 22 wherein said pivot means includes axle means laterally extending from said housing to permit said rotation of said housing.

31. The apparatus as defined by claim 22 including an open tray positioned generally below said utility connector module and adapted to manage the excess length of cords and cables extending from the removable utility taps plugged into said utility connector module.

32. The apparatus as defined by claim 31 wherein said open tray includes a divider to separate the cords and cables carrying different types of utilities to prevent interference therebetween.

33. The apparatus as defined by claim 22 wherein said mount is adapted to receive at least two of said housings with said housings being positioned in opposing relationship.

34. The apparatus as defined by claim 22 wherein said housing defines a substantially liquid-tight interior compartment suitable to hold electrical circuitry, switches, fuses, and the like.

35. In a furniture unit of the type having a worksurface, the improvement of a module for dispensing utilities at a selected location on said workstation, comprising:
   a mounting bracket positioned in a selected portion of said worksurface;
   a housing having an imperforate cover and shaped for reception within said mounting bracket;
   pivot means for pivotally connecting said housing with said mounting bracket to permit rotation of said housing between an open and closed position;
   a utility connector module having a face with at least one electrical receptacle opening therein for dispensing electrical power shaped to detachably receive a removable utility tap therein and through which associated utilities can be selectively accessed;
   said utility connector module being mounted on said housing beneath said imperforate cover such that rotation of said housing into the closed position retracts said housing below the worksurface and rotation of said housing into the open position provides ready access to said utility connector module; said module face when in any position being oriented such that a line extending perpendicularly from said face through said at least one electrical receptacle opening is never oriented at an angle above horizontal, whereby liquid spilled on said housing and said utility connector module will naturally flow away from said at least one receptacle opening and not into said electrical receptacle opening;
   said imperforate cover extending substantially horizontally over said electrical receptacle opening when said housing is in the closed position, said imperforate cover being shaped to direct liquid away from said electrical receptacle opening; and
   said mounting bracket including a rim which keeps liquids spilled on the worksurface from washing onto said housing.

36. The apparatus as defined by claim 35 wherein said pivotal means provides space between said mounting bracket and said housing through which liquids flow when spilled onto said housing.

37. The apparatus by claim 36 including a plurality of different utility connector modules, each having a unique face and related set of openings; and
   means for detachably mounting one of said utility connector modules on said housing beneath said imperforate cover.

38. In a furniture unit of the type having a worksurface, the improvement of a module for dispensing utilities at a selected location on said workstation, comprising:
   a mounting bracket positioned in a selected portion of said worksurface;
   a worksurface having an imperforate cover and shaped for reception within said mounting bracket;
   pivot means for pivotally connecting said housing with said mounting bracket to permit rotation of said housing between an open and closed position;
   a utility connector module having a face with at least one electrical receptacle opening therein for dispensing electrical power shaped to detachable receive a removable utility tap therein and through which associated utilities can be selectively accessed;
   said utility connector module being mounted on said housing beneath said imperforate cover such that rotation of said housing into the closed position retracts said housing below the worksurface and rotation of said housing into the open position provides ready access to said utility connector module; said module face when in any position being oriented such that a line extending perpendicularly from said face through said at least one electrical receptacle opening is never oriented at an angle above horizontal, whereby liquid spilled on said housing and said utility connector module will naturally flow away from said at least one receptacle opening and not into said electrical receptacle opening; and
   a second housing pivotally supported in said mounting bracket in opposing relationship to said first housing; said second housing having a plurality of second utility connector modules that can be selectively mounted to said second housing, said second connector modules having a second face shaped to detachably receive removable communication utility taps.

39. In a furniture unit of the type having a worksurface, the improvement of a module for dispensing utilities at a selected location on said workstation, comprising:
   a mounting bracket positioned in a selected portion of said worksurface;
   a housing having an imperforate cover and shaped for reception within said mounting bracket;

pivot means for pivotally connecting said housing with said mounting bracket to permit rotation of said housing between an open and closed position;
a utility connector module having a face with at least one electrical receptacle opening therein for dispensing electrical power shaped to detachably receive a removable utility tap therein and through which associated utilities can be selectively accessed;
said utility connector module being mounted on said housing beneath said imperforate cover such that rotation of said housing into the closed position retracts said housing below the worksurface and rotation of said housing into the open position provides ready access to said utility connector module; said module face when in any position being oriented such that a line extending perpendicularly from said face through said at least one electrical receptacle opening is never oriented at an angle above horizontal, whereby liquid spilled on said housing and said utility connector module will naturally flow away from said at least one receptacle opening and not into said electrical receptacle opening;
said mounting bracket being adapted to set in an aperture in the worksurface and be supported in a hanging fashion from the marginal edge of the aperture, said mounting bracket being adapted to receive at least two of said housings;
an open tray positioned generally below said utility connector module and adapted to manage the excess length of cords and cables extending from the removable utility taps plugged into said utility connector modules;
said open tray including a divider to separate the cords and cables from carrying different types of utilities to prevent interference therebetween; and
a removable cover that is positionable to cover said housing when said housing is in the closed position, said removable cover having an upper surface that directs fluids away from said utility connector module.

40. In a furniture unit of the type having a worksurface, the improvement of a module for dispensing utilities at a selected location on said workstation, comprising:
a mounting bracket positioned in a selected portion of said worksurface;
a housing having an imperforate cover and shaped for reception within said mounting bracket;
pivot means for pivotally connecting said housing with said mounting bracket to permit rotation of said housing between an open and closed position;
a utility connector module having a face with at least one electrical receptacle opening therein for dispensing electrical power shaped to detachably receive a removable utility tap therein and through which associated utilities can be selectively accessed;
said utility connector module being mounted on said housing beneath said imperforate cover such that rotation of said housing into the closed position retracts said housing below the worksurface and rotation of said housing into the open position provides ready access to said utility connector module; said module face when in any position being oriented such that a line extending perpendicularly from said face through said at least one electrical receptacle opening is never oriented at an angle above horizontal, whereby liquid spilled on said housing and said utility connector module will naturally flow away from said at least one receptacle opening and not into said electrical receptacle opening; and
a support piece having a rim which keeps liquids spilled on the worksurface from entering said aperture.

41. In a furniture unit of the type having a worksurface, the improvement of a module for dispensing utilities at a selected location on said workstation, comprising:
a mounting bracket positioned in a selected portion of said worksurface;
a housing having an imperforate cover and shaped for reception within said mounting bracket;
pivot means for pivotally connecting said housing with said mounting bracket to permit rotation of said housing between an open and closed position;
a utility connector module having a face with at least one electrical receptacle opening therein for dispensing electrical power shaped to detachably receive a removable utility tap therein and through which associated utilities can be selectively accessed;
said utility connector module being mounted on said housing beneath said imperforate cover such that rotation of said housing into the closed position retracts said housing below the worksurface and rotation of said housing into the open position provides ready access to said utility connector module; said module face when in the closed position being oriented such that a normal line extending from said face through said one electrical receptacle opening is not oriented at an angle above horizontal, whereby liquid spilled on said housing and said utility connector module will naturally flow away from said one receptacle opening and not into said electrical receptacle opening; and
a removable lid positionable to cover said housing when said housing is in the closed position, said lid having upper surface that directs fluids away from said utility connector module.

42. The apparatus as defined in claim 41 wherein the lid includes a notch located along at least one side of the lid for allowing cables to be routed therethrough.

43. The apparatus as defined in claim 41 wherein the lid is reversible.

44. A module for dispensing utilities at a selected workstation comprising:
a housing mount adapted to set within an aperture in the selected worksurface in a hanging fashion, the housing mount including a support means for engaging the marginal edge of the aperture to support the housing mount;
a housing shaped to set within said housing mount;
pivot means for pivotally mounting said housing to said housing mount, said pivot means allowing said housing to pivot between an open access position and closed position;
a utility connector module mounted to said housing, said connector module including a receptacle opening oriented so that said receptacle opening is accessible when said housing is in said open access position and said receptacle opening is substantially hidden when said housing is in said closed position; and
said housing mount having a rim which keeps liquids spilled on the worksurface from entering said housing.

* * * * *

UNITED STATES PATENT AND TRADEMARK OFFICE
CERTIFICATE OF CORRECTION

PATENT NO. : 5,230,552

DATED : July 27, 1993

INVENTOR(S) : Timothy H. Schipper et al.

It is certified that error appears in the above-identified patent and that said Letters Patent is hereby corrected as shown below:

Column 1, line 55;
  "ne" should be --one--.

Column 4, line 22;
  After "assembly 16" insert --.--.

Column 4, line 61;
  After "wall 74" insert --.--.

Column 6, line 46;
  Before "(and etc." insert --30--.

Column 8, line 54;
  After "location" insert --.--.

Column 9, line 48;
  After "housing" insert --assembly--.

Column 14, claim 37, line 13;
  After "apparatus" insert --as defined--.

Signed and Sealed this

Thirty-first Day of May, 1994

*Attest:*

BRUCE LEHMAN

*Attesting Officer*   *Commissioner of Patents and Trademarks*